(12) United States Patent
Andersson

(10) Patent No.: US 7,455,337 B2
(45) Date of Patent: Nov. 25, 2008

(54) UNDERRUN PROTECTION ARRANGEMENT FOR A VEHICLE AND METHOD OF ASSEMBLING SUCH AN ARRANGEMENT

(75) Inventor: Jorgen Andersson, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/160,313

(22) Filed: Jun. 17, 2005

(65) Prior Publication Data

US 2006/0012193 A1 Jan. 19, 2006

Related U.S. Application Data

(63) Continuation of application No. PCT/SE2003/001950, filed on Dec. 12, 2003, now abandoned.

(30) Foreign Application Priority Data

Dec. 17, 2002 (SE) .................................... 0203720

(51) Int. Cl.
*B60R 19/56* (2006.01)
(52) U.S. Cl. ..................... 293/120; 293/34; 293/131
(58) Field of Classification Search .............. 296/14, 296/34, 131, 132, 133, 147, 153, 102
See application file for complete search history.

(56) References Cited

U.S. PATENT DOCUMENTS

| 3,913,963 | A | * | 10/1975 | Persicke | 293/131 |
| 4,247,138 | A | * | 1/1981 | Child | 293/131 |
| 5,507,546 | A | * | 4/1996 | Holley | 293/133 |
| 6,089,629 | A | * | 7/2000 | Hope et al. | 293/132 |
| 6,116,667 | A | * | 9/2000 | Torcomian | 293/132 |
| 6,176,530 | B1 | * | 1/2001 | Gollungberg | 293/133 |
| 6,183,025 | B1 | * | 2/2001 | Hope et al. | 293/131 |
| 6,764,116 | B2 | * | 7/2004 | Ledford et al. | 293/102 |
| 6,799,783 | B2 | * | 10/2004 | Gollungberg et al. | 293/102 |

* cited by examiner

*Primary Examiner*—Jason S Morrow
(74) *Attorney, Agent, or Firm*—Novak Druce + Quigg, LLP

(57) ABSTRACT

Underrun protection method and arrangement for a vehicle including a frame, an impact element arranged in a position corresponding to an anticipated stress from a force in the event of a possible collision with another vehicle. At least one connecting element is provided by way of which the impact element is fixed to the frame. The impact element includes an upper transverse beam and a lower transverse beam fixed to the upper transverse beam. Another aspect of the invention is the arrangement's unique assemblage.

12 Claims, 7 Drawing Sheets

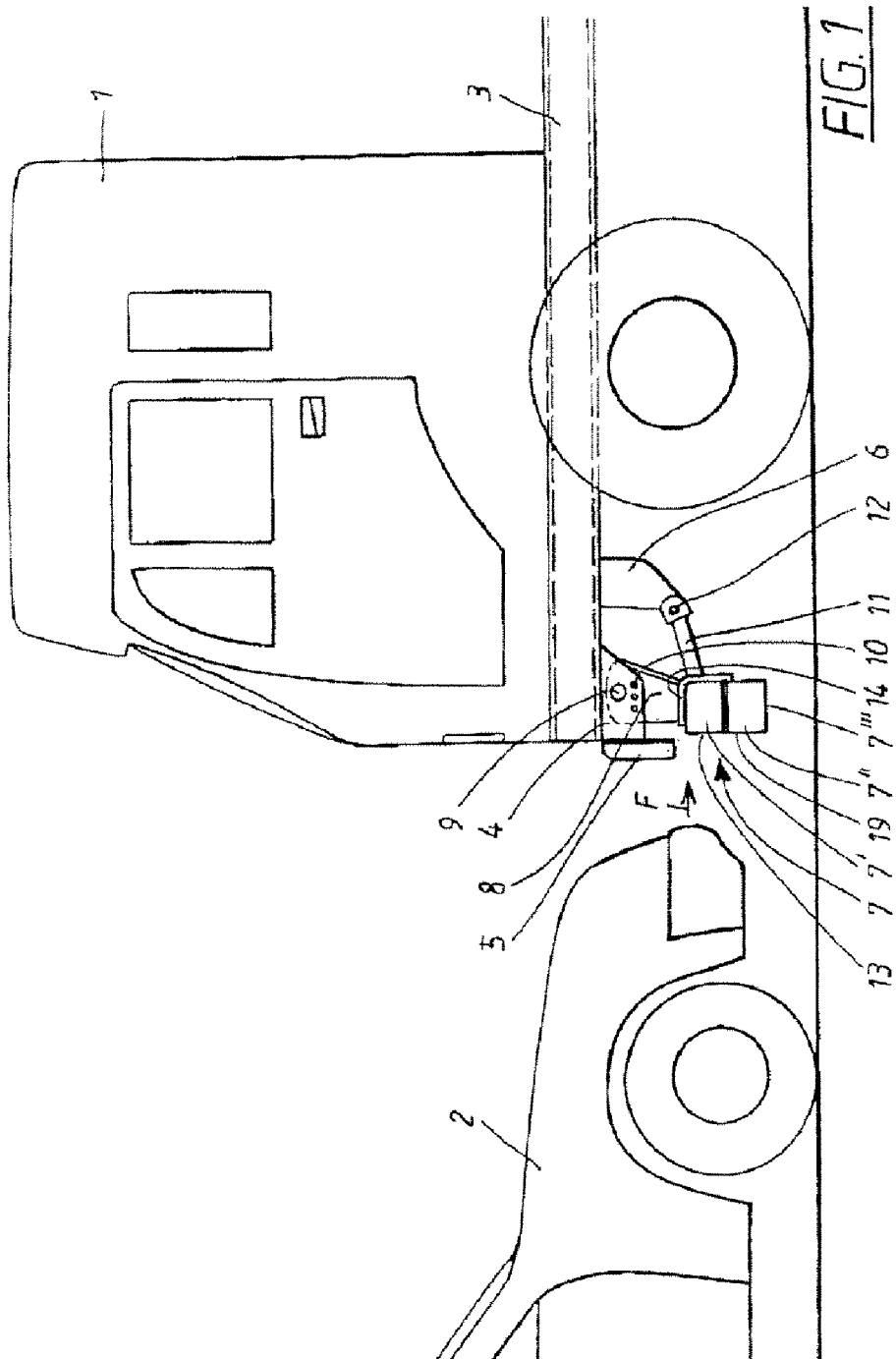
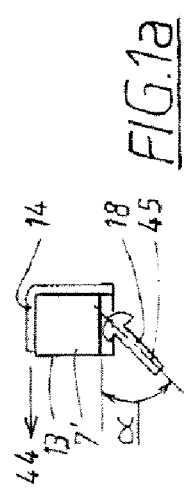
FIG. 1
FIG. 1a

UNDERRUN PROTECTION ARRANGEMENT FOR A VEHICLE AND METHOD OF ASSEMBLING SUCH AN ARRANGEMENT

CROSS-REFERENCE TO RELATED APPLICATIONS

The present application is a continuation patent application of International Application No. PCT/SE2003/001950 filed 12 Dec. 2003 which was published in English pursuant to Article 21(2) of the Patent Cooperation Treaty, and which claims priority to Swedish Application No. 0203720-8 filed 17 Dec. 2002. Said applications are expressly incorporated herein by reference in their entireties.

TECHNICAL FIELD

The present invention relates to an underrun protection arrangement for a vehicle comprising a frame, an impact element arranged in a position corresponding to an anticipated stress from a force in the event of a possible collision with another vehicle, and at least one connecting element by way of which the impact element is fixed to the frame. The connecting element is usually designed as a link element which is firmly connected to the impact element and fixed so that it can pivot in relation to the frame. Where appropriate, an energy-absorbing element is used that connects the impact element to the frame and is designed to be compressed in the event of a pivoting movement of the impact element. The primary application of the invention is in heavier trucks, especially in order to prevent a passenger vehicle running in under the truck in the event of a head-on collision between the truck and the passenger vehicle. The invention also relates to a method of assembling such an arrangement.

BACKGROUND OF THE INVENTION

Larger motor vehicles, such as trucks, are nowadays designed with relatively high ground clearance. A principal reason for this lies in the need to be able to use the vehicle when driving on uneven surfaces, for example.

The fact that a truck normally has a relatively high ground clearance, however, constitutes a risk in terms of road safety. This is due to the fact that in a possible head-on collision between a truck and a passenger car there is a risk that the front section of the passenger car will run in under the front of the truck and thus become wedged fast between the roadway and the underside of the front of the truck. This can lead to the front of the truck penetrating the passenger compartment of the car with great force. In even more unfortunate cases, the truck can continue forward and roll over the passenger car.

One solution to this problem is to provide the truck with special underrun protection in the form of a reinforced structure, such as a force-absorbing beam element, which is arranged horizontally at the front of the truck. This beam element is more specifically arranged in a position corresponding to an anticipated stress from a force in the event of a collision with a passenger car. Such an element can serve to prevent the passenger car running in under the front of the truck.

Vehicles are manufactured in various designs depending on the sphere of application in which the vehicle is to be used. This means that vehicles having the same frame and cab construction may be designed with different frame heights. In order to provide an effective underrun protection, the position of the underrun protection must be adjusted according to the frame height of the vehicle. In order to ensure that common components can be used for vehicles with different frame heights, a lower transverse beam has been added to an upper transverse beam forming an impact element in an underrun protection fitted to the vehicle.

It has emerged that fitting the lower transverse beam to the upper transverse beam is complicated. This is due partly to the fact that the upper transverse beam is somewhat inaccessible after the vehicle cab has been fitted, and partly to the fact that the connection between the existing impact element and the lower transverse beam must be very strong, since it is exposed to very large forces in the event of a collision.

SUMMARY OF THE INVENTION

An object of the invention is to create a connection between an upper transverse beam constituting an impact element in an underrun protection and a lower transverse beam arranged up to the upper transverse beam in a manner that allows the lower transverse beam to be readily fitted to the upper transverse beam after the upper transverse beam has been fitted to a vehicle.

The use of the lower transverse beam ensures that the lower edge of the impact element is located in a sufficiently low position to form an effective underrun protection for a passenger car. For this purpose, the lower edge of the lower beam must be located no higher than 400 mm above the ground when the underrun protection has been fitted to a vehicle. The lower transverse beam may be manufactured in various designs with different heights, with the correct position of the lower edge of the underrun protection being achievable through the choice of beam height.

According to the invention, an upper transverse beam is used which has at least one through-opening, the shape of which partly defines the area for the passage of the head of a bolt or a washer fitted around the shank of the bolt. Broadly speaking, the upper portion of the bolt may be referred to as a "securement portion," which consists of the head of the bolt or, in combination, the head and a washer. Use of a washer is preferred and will be described in detail below. Therefore, to that end, the through-opening therefore preferably has a shape which will permit the passage of a bolt head and the passage of a washer that is fitted to the shank of the bolt. The bolt head and washer are inserted by pivoting the bolt about an axis perpendicular to a longitudinal axis of the bolt. The through-opening therefore has an area wide enough to allow the washer to pass. The through-opening is furthermore designed to form bearing surfaces radially outside the periphery of the through-opening. The bearing surfaces are thus situated outside the periphery of the through-opening which at the bearing surfaces is arranged at a distance from a center point of the through-opening which is less than the radial extent of the washer. Once the head of the bolt and the washer have been inserted through the through-opening, the washer is brought to bear level against the bearing surfaces of the upper transverse beam. The lower transverse beam can be joined to the upper transverse beam in that the shank of the bolt enters a through-opening in the lower transverse beam, following which a nut is fitted to the bolt shank. Once the connection has been tightened, the bolt washer and head of the bolt can no longer pass through the through-opening since this requires the bolt to be located in a position in which the shank of the bolt forms an angle with a normal to the section of the beam on which the through-opening is arranged.

Fitting of the lower transverse beam is facilitated since the head of the bolt and the washer can be inserted through a through-opening arranged in the upper beam. This means that a fitter is not reliant upon access to the top side of the upper beam when fitting, as would be the case if the head of the bolt and the washer could not pass through the through-opening. Furthermore, the upper transverse beam does not need to be provided with a screw thread, which would make manufacture of the underrun protection more expensive.

According to a preferred embodiment of the invention, the passage areas are designed to permit the passage of a washer fitted around the shank of a bolt by pivoting the bolt about an axis which is essentially parallel to the longitudinal direction of the upper transverse beam, the head of the bolt being inserted with its shank aligned in a direction which forms an angle of less than 600 with a normal to a front boundary surface constituting the impact surface of the upper transverse beam.

This embodiment ensures that insertion is made in the opposite direction to the displacement that is produced by shear forces in the event of a crash. Should a collision occur, shear forces will cause the bolt to be turned essentially in the opposite direction. This reduces the risk of the connection coming loose. This furthermore facilitates fitting, since during assembly the shank of the bolt will be directed outwards from the impact element away from the vehicle.

According to a further preferred embodiment, the lower transverse beam has at least one projection designed to be inserted into the through-opening provided on the upper beam, the projection having a cross-section of a shape such that the projection prevents displacement between the lower and the upper transverse beam in the plane of the upper surface when the projection is inserted in the through-opening. The projection therefore fixes the lower beam and prevents it being displaced in relation to the upper beam. The projection is preferably designed to bear along the greater part of the periphery of the through-opening. The use of a projection provides a very stable connection capable of absorbing the very large forces that occur in the event of a collision.

The object of the invention is also achieved by a method of assembling an impact element.

BRIEF DESCRIPTION OF DRAWINGS

The invention will be explained in greater detail below with reference to a preferred example of one embodiment, and to the attached drawings in which:

FIG. 1 shows a schematic side view of an arrangement configured according to the teachings of the present invention; FIG. 1*a* shows the position of the bolt form a side view of the upper transverse beam;

The invention constitutes an underrun protection which is particularly, but not exclusively intended for trucks with a relatively high ground clearance. FIG. 1 is a somewhat simplified side view showing a truck 1, which is provided with an arrangement configured according to the invention. The figure also shows a passenger car 2. It will be seen from the figure that a possible head-on collision between a passenger car and a truck can lead to the passenger car becoming wedged fast between the truck and the roadway, which can lead to serious injuries to occupants of the passenger car 2. A fundamental object of the present invention is to prevent such a situation arising.

Figure 2:
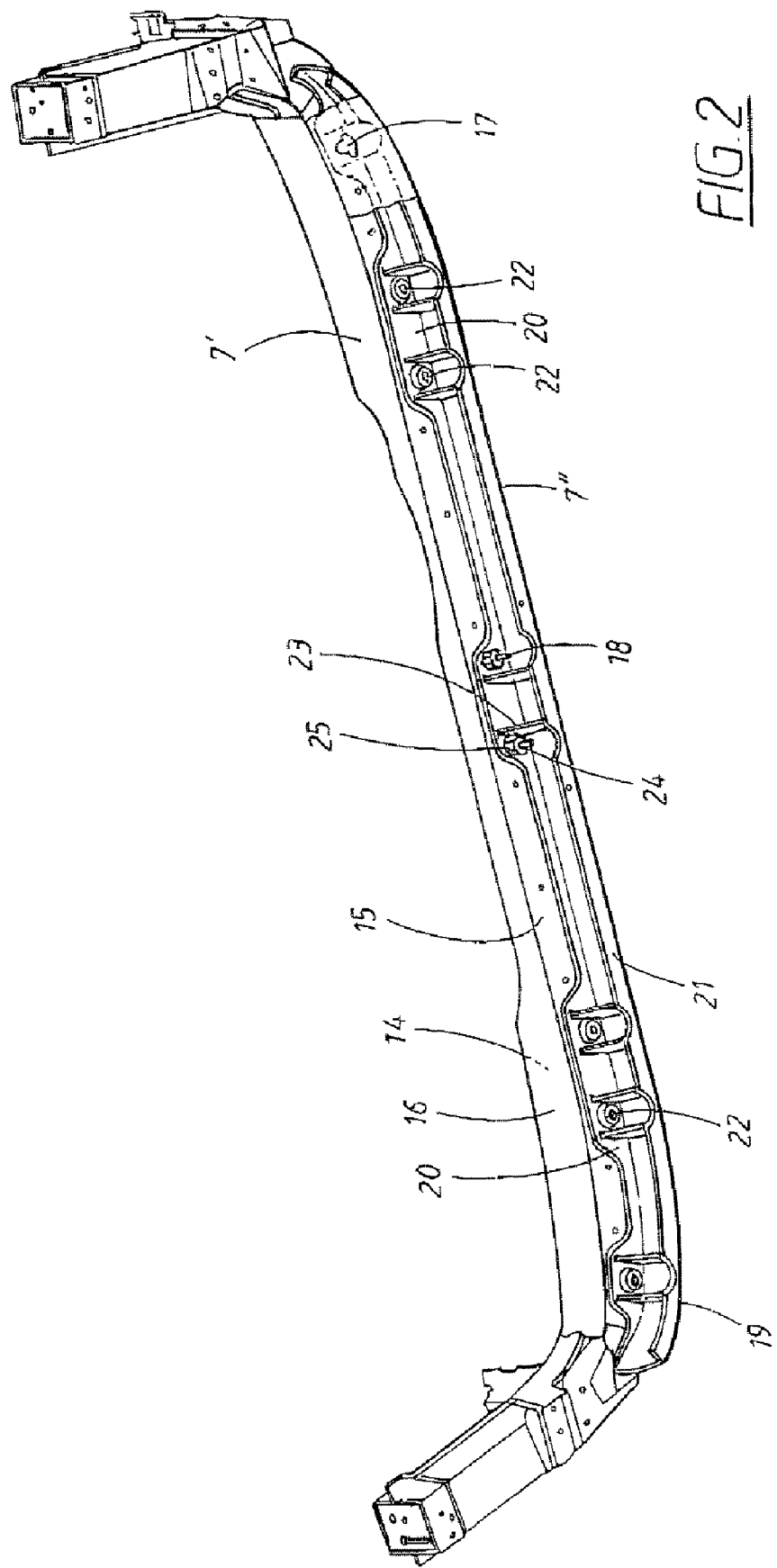
FIG. 2 shows an oblique view from below of an arrangement configured according to the present invention comprising an upper transverse beam and a lower transverse beam.

The truck 1 is of conventional construction having a frame which in turn comprises (includes, but is not necessarily limited to) two longitudinal frame members, of which only one frame member 3 can be seen from FIG. 1. Each frame member 3 essentially extends in the longitudinal direction of the truck 1, up to the front section thereof. According to a preferred embodiment of the invention, two front brackets 4 are fixed to the front part of the respective frame member 3. However, only one of these two front brackets 4 can be seen from the figure. A bumper 5 is also conventionally arranged, extending horizontally across the front section of the truck 1. The bumper 5 is firmly connected to the frame member 3.

Two further rear brackets 6 are firmly connected to a part of the respective frame member 3, which is situated behind the aforementioned front brackets 4. Only one of the two rear brackets 6 can be seen from FIG. 1.

In order to prevent the aforementioned situation in which the passenger car 1 runs in under the front of the truck 1 in the event of a possible head-on collision or offset collision (that is to say a collision in which the longitudinal axis of symmetry of the passenger car is somewhat offset parallel to the longitudinal axis of symmetry of the truck), the truck 1 is provided with an underrun protection. According to the embodiment, the underrun protection comprises an impact element 7 in the form of an upper transverse beam 7' extending essentially horizontally and transversely to the longitudinal direction of the vehicle 1. This upper transverse beam 7' is preferably made of steel or other suitable material and preferably has an essentially rectangular (or square) cross-section. In order to ensure that the impact element has a lower edge 7''' situated at the correct height above the ground, which corresponds to height of less than 400 mm, a lower transverse beam 7'' has been fitted in connection with the upper transverse beam 7'.

The ground clearance of the impact element 7 may be defined as the distance from the underlying roadway to the underside of the impact element 7. As has been stated above, this distance must be selected according to the desired ability to traverse uneven ground and also, where appropriate, the prevailing statutory requirements. For conventional trucks the ground clearance is normally less than or equal to 400 mm.

The impact element 7 is fixed to the frame 3 of the vehicle by way of a connecting element 8. According to a preferred embodiment of the invention, the impact element 7 is suspended so that it can move in relation to the frame. More specifically, the upper transverse beam 7' is preferably fixed in such a way that it is fixed to two link elements 8 (of which only one link element 8 can be seen from FIG. 1), which are in turn pivotally fixed to the respective front bracket 4. Each link element 8 is furthermore pivotally supported in a shaft journal 9 which runs through the respective front bracket 4. The impact element 7 can in this way be pivoted in relation to the frame structure of the truck 1. This pivoting movement is also permitted under certain operating conditions, as will be described in detail below. However, in normal driving with the truck 1, for example, such a pivoting movement of the impact element 7 and the link elements 8 is prevented in that the link elements 8 are locked in relation to the respective front bracket 4 by way of at least one, preferably two, locking elements 10 in the form of strong retaining bolts.

The upper transverse beam 7' is furthermore connected to each rear bracket 6 by way of two energy-absorbing connecting elements in the form of two tubes or bars 11, which are longitudinally compressible. Only one tube 11, however, can be seen from FIG. 1. Each energy-absorbing tube 11 is firmly connected to the upper transverse beam 7' by way of the aforementioned link elements 8 (the tube 11 suitably being welded to the corresponding link element) and is rotatably fixed to the respective rear bracket 6. More specifically, the tube 11 is pivotally fixed to a further shaft journal 12 extending through both the tube 11 and the rear bracket 6.

FIG. 2 shows the fixing of the lower transverse beam 7" to the upper transverse beam 7' in a view from below. In the embodiment shown the upper transverse beam consists of a largely closed structure of rectangular cross-section. The upper transverse beam 7' has a front impact surface 13, and upper surface 14, a lower surface 15 and a rear side 16. Through-openings 17 are arranged in the lower surface 15. The through-openings are designed to permit the passage of the head (not shown) of a bolt 18 and a washer (not shown) placed around the shank of the bolt. A lower transverse beam 7" is fixed to the upper transverse beam 7' by bolted connections. The lower transverse beam 7" extends essentially parallel to the upper transverse beam 7'. The lower and the upper transverse beams together form an impact element, preferably with a common impact surface which is formed by the front impact surface 13 of the upper transverse beam 7' and a front impact surface 19 of the lower transverse beam 7". In the example of an embodiment shown the lower transverse beam is an open U-beam construction having an upper bearing surface 20 and a lower flange 21, which extends rearwards from the front impact surface 19. The upper bearing surface has through-openings 22 which are adapted to receive the shank of a bolt 18, the lower transverse beam 7" being fixed by the shank of the bolt 18. According to the embodiment shown, the lower transverse beam is equipped with transverse flanges 23, which run between the upper bearing surface 20 and the lower flange 21. The function of the transverse flanges 23 is to give the lower transverse beam sufficient torsional rigidity to withstand substantial deformation in the event of a collision. The lower transverse beam is designed with an open cross-section allowing easy access to the shank 24 of the bolt 18 for the fitting of a nut 25. The upper transverse beam has fixing points for fixing to the connecting element 8 (not shown in FIG. 2).

Figure 3:
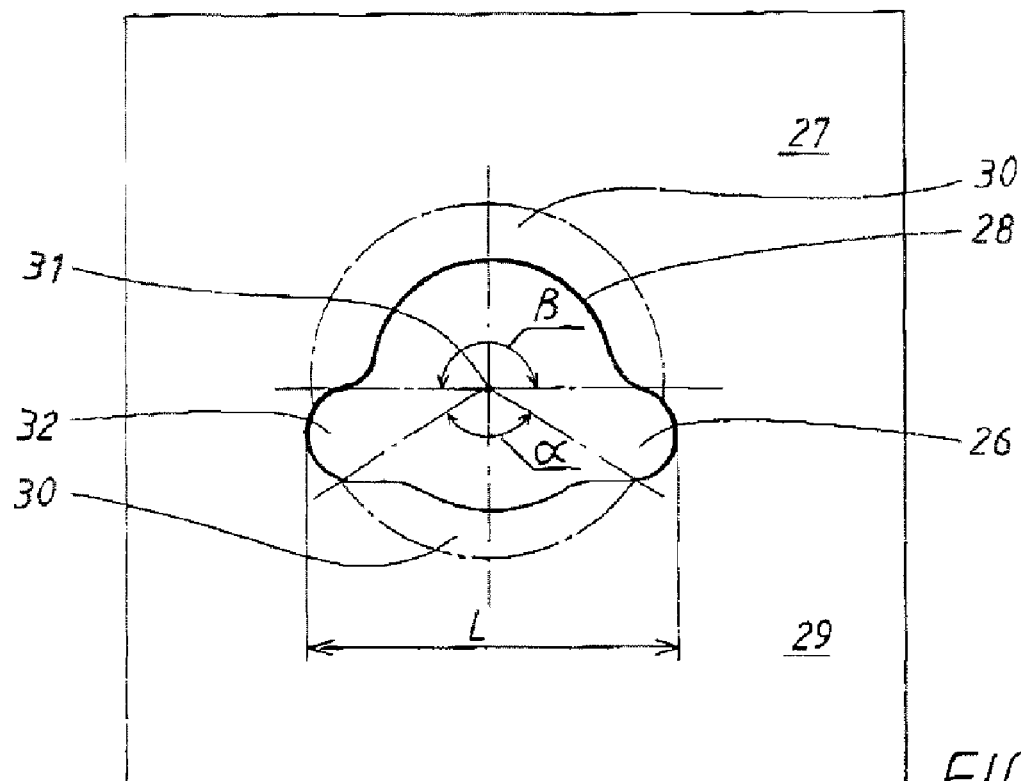
FIG. 3 shows a through-opening in the upper transverse beam formed according to the invention, allowing the passage of a bolt head and a washer arranged around the shank of the bolt.

FIG. 3 shows a through-opening 17 according to the invention. The through-opening 17 has a shape which partially defines the area for the passage 26 of a washer (not shown) fitted around the shank of a bolt when the bolt 18 is placed in a position in which the shank of the bolt forms an angle with a normal to the section 27 of the beam in which the through-opening is arranged. Outside the periphery 28 of the through-opening, an inner wall 29 (FIG. 5) of the lower surface 15 of the upper transverse beam 7' forms bearing surfaces 30 where the periphery 28 of the through-opening is arranged at a distance from a center point 31 of the through-opening 17 which is less than the radial extent R of the washer (not shown).

In the embodiment shown, the through-opening 17 takes the shape of a circle with two symmetrically arranged recesses 32 which form the area for the passage 26 of a washer arranged around the shank of the bolt. The recesses are formed so that the distance L between outer parts of the periphery of the recesses is greater than the diameter of the circle. In the example of an embodiment shown, the recesses 32 are each formed as semi-circles which are located on the circle forming the greater part of the through-opening.

The shape of the through-opening 17 can be adapted to the outward form of the bolt head and the size of the washer in such a way as to allow passage of the washer and the bolt head. It is desirable for the through-opening 17 to be formed so that the bearing surfaces 30 on which the washer bears when placed parallel to the inner wall 29 are as large as possible and extend as far around the center point 31 of the through-opening 17 as possible. The bearing surfaces preferably extend with a combined opening angle $\alpha+\beta$ for all constituent bearing surfaces 30 in excess of 180°, and preferably at least 220°.

Figure 4:
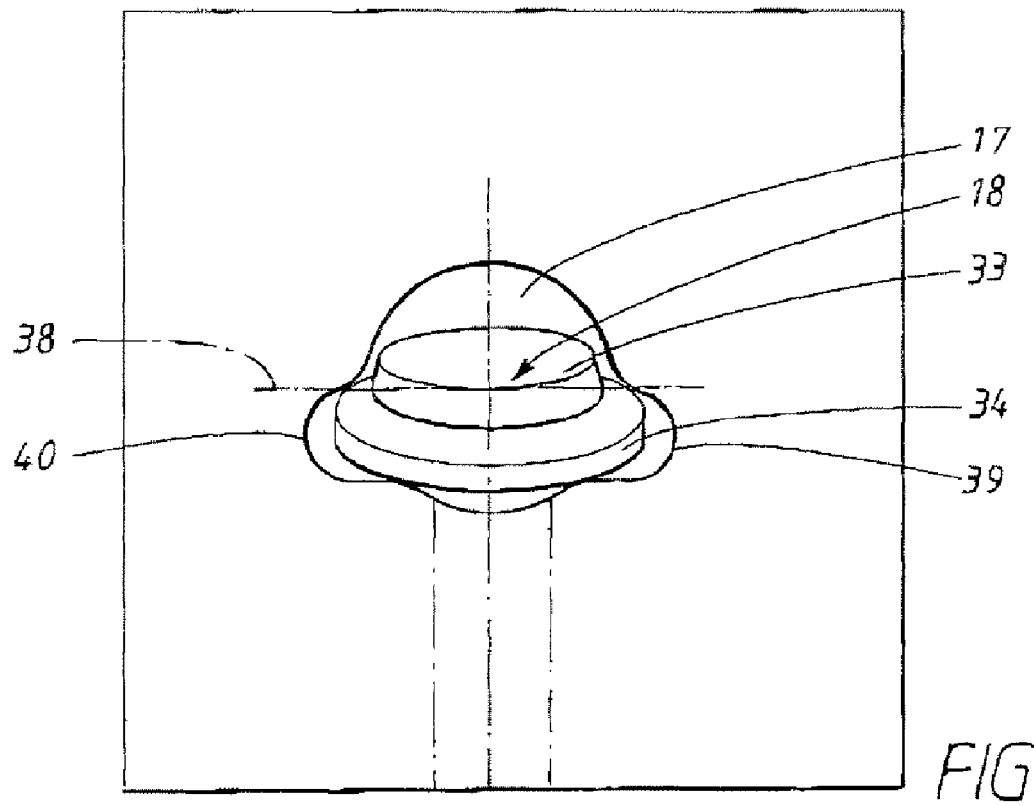
FIG. 4 shows a through-opening in the upper transverse beam with a bolt partially inserted through the through-opening.

FIG. 4 shows a through-opening 17 in the upper transverse beam with a bolt 18 partially inserted through the through-opening. The bolt is formed with a head 33 and a washer 34 of radius R arranged around the shank (not shown) of the bolt. The through-opening has a shape which allows the washer 34 and the head 33 of the bolt to pass through the through-opening.

Figure 5:
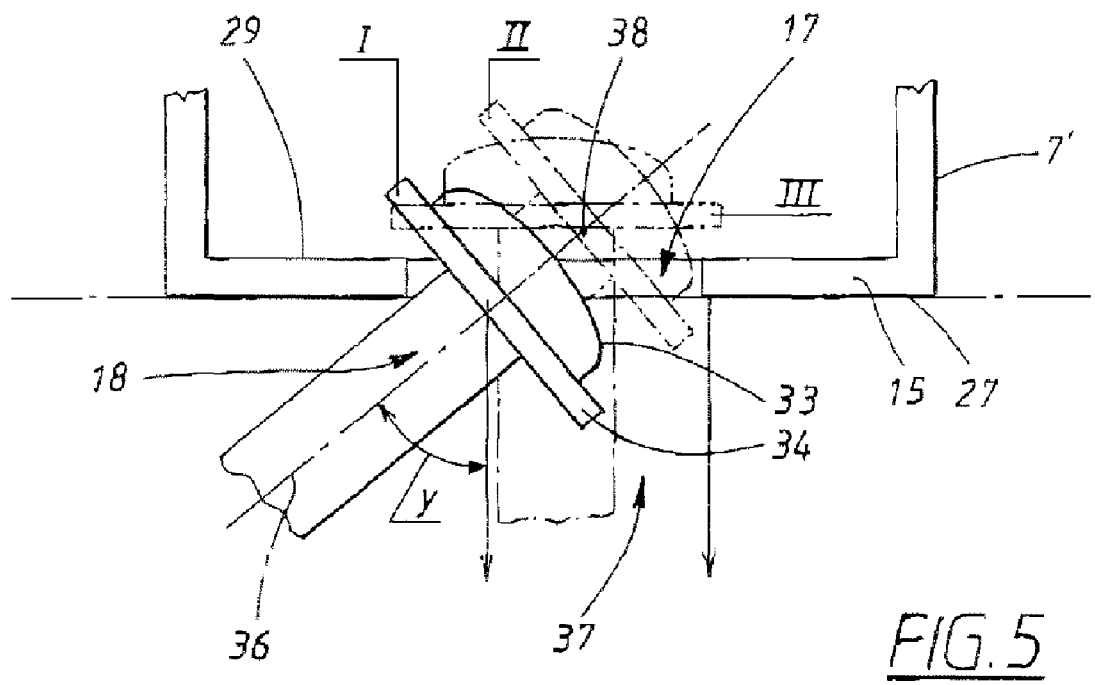
FIG. 5 shows the bolt in FIG. 4 viewed from the side.

FIG. 5 shows a side view of the bolt 18 in FIG. 4. The bolt is placed in a position which permits the passage of the washer 34 and the head 33. The washer has been inserted into the areas for passage 26 formed in the through-opening 17. Between these areas the through-opening has a width sufficient to allow passage of the washer. The shank 35 of the bolt runs in a direction 36 forming an angle $\gamma$ with a normal 37 to the section 27 of the beam in which the through-opening 17 is formed. The washer 34 and the head 33 of the bolt are inserted through the through-opening 17 partly by shifting from the starting position I in an axial direction along the direction 36 to a second somewhat more inserted position II. In this position the bolt 18 is swiveled about an axis of rotation 38 running parallel to a connecting line between points 39, 40 of the recesses 32 furthest remote from one another. The bolt and the washer are moved by pivoting into a third position III where the washer lies in a plane running parallel to the inner wall 29 of the upper transverse beam 7'. From this third position III the washer 34 and the head 33 of the bolt can be moved so that the washer 34 bears tightly against the inner wall 29. This position is shown in FIG. 6.

In a preferred embodiment of the invention, the areas for passage 26 are formed in order to permit the passage of a washer fitted around the shank of the bolt by swiveling the bolt about an axis that is largely parallel to the longitudinal direction of the upper transverse beam, the bolt head being inserted with its shank aligned in a direction forming an angle of less than 60° with a normal to a front boundary surface constituting the impact surface of the upper transverse beam. This is shown schematically in the inset diagram 1a in FIG. 1 from which it can be seen that the angle between the normal 44 to the impact surface 13 and the axis of symmetry 45 of the bolt is less than 60°.

Figure 6:
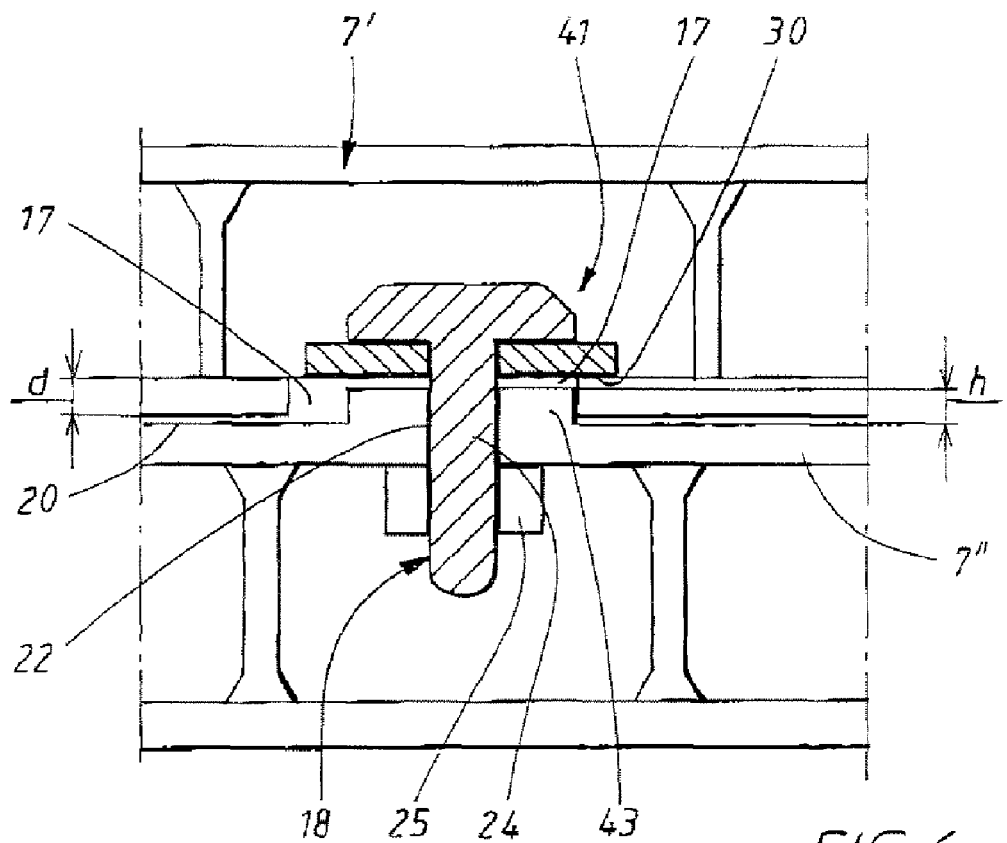
FIG. 6 shows a bolted connection which joins an upper transverse beam to a lower transverse beam.

FIG. 6 shows a bolted connection 41 which connects an upper transverse beam 7' to a lower transverse beam 7". The upper transverse beam has a through-opening 17 as described in connection with FIGS. 4 and 5. The head 33 and a washer 34 arranged around the shank 24 of the bolt have been fitted through the through-opening 17 and placed resting on the bearing surfaces 30 of the inner wall 29 of the upper transverse beam 7'. The shank 42 of the bolt runs through a through-opening 22 arranged in the upper bearing surface 20 of the lower transverse beam 7". The through-opening 22 is of a size designed to receive the shank 24 of the bolt and to prevent the lower beam moving in relation to the shank of the bolt in a plane perpendicular to the extent of the shank. The upper bearing surface is formed with a projection 43 designed to be inserted into the through-opening arranged on the upper beam. The projection 43 has a cross-section shaped so that the projection prevents displacement between the lower and the upper transverse beam in the plane of the upper surface when the projection is inserted into the through-opening. For this purpose the projection 43 is preferably formed with a circular cross-section.

In order to ensure that the bolted connection 41 can apply clamping force between the upper and the lower transverse beam 7', 7", the projection 43 is formed so that its extent in a vertical direction, h, is less than the depth, d, of the corresponding through-opening 17. A nut 25 locks the upper transverse beam 7' to the lower transverse beam 7".

Figure 7:
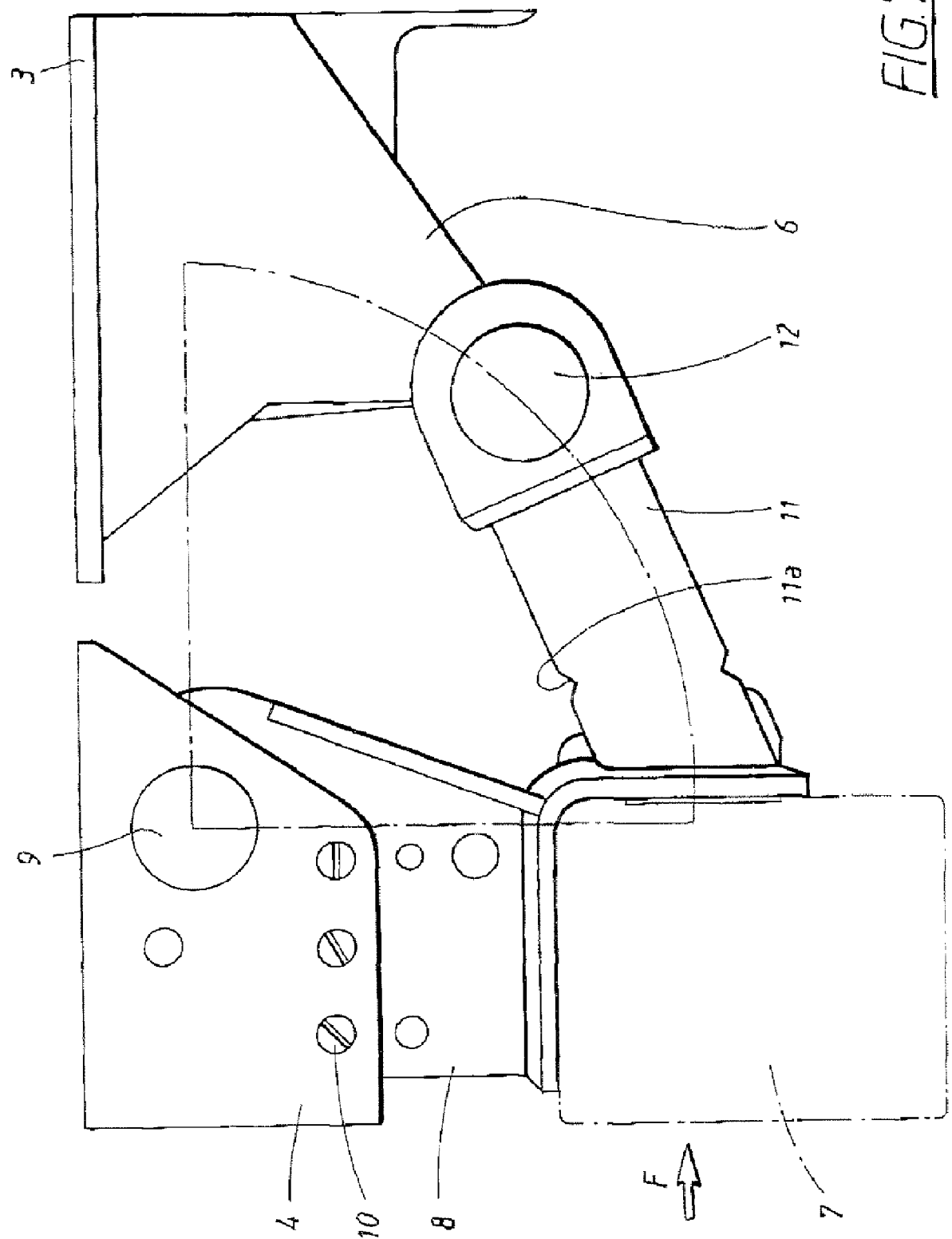
FIG. 7 is a detailed view of the arrangement according to the invention in a first working position.

FIG. 7 shows a detailed view of a preferred embodiment of the connecting element 8. In the event of a collision between the truck and the passenger car, the impact element 7 will be acted upon by a large force F. This force F will be transmitted to each front bracket 4 via the respective link element 8, the force being absorbed by the frame structure of the vehicle 1 in that each front bracket 4 is fixed to the frame structure and that the link elements 8 are locked in relation to the respective front bracket 4 by way of the bolted connection that is formed by the aforementioned retaining bolts 10.

During an initial phase of a collision between the truck and the passenger car, it is desirable for the impact element 7 to function as a largely unresilient and rigid barrier. This is achieved by the retaining bolts 10, by means of which each link element 8 is held firmly anchored to the respective front bracket 4. In the course of a collision this is also accomplished in that the front crumple zones normally present on modern passenger cars are deformed in absorbing the energy. In this way the energy that is generated during the initial phase will be largely absorbed by this deformation of the crumple zones of the passenger car. According to the invention, the retaining bolts 10 are designed in order to withstand the stresses acting on the impact element 7 during this initial phase.

The fact that the impact element 7 and the brackets 4 absorb the force, F, under stressing from the passenger car 2 therefore prevents the passenger car 2 running in between the truck 1 and the roadway during this initial phase.

The state existing when the crumple zones in the passenger car have been compressed and are no longer capable of making any significant contribution to the absorption of energy is normally commensurate with the impact element 7 having reached certain components in the passenger car, such as its engine and gearbox. An increase in the stress acting on the impact element 7 then occurs. An underlying principle of the invention is that the aforementioned securing bolts 10 are designed and arranged in such a way that they give way and are torn apart at a predefined limit which preferably corresponds to this increased stress from the passenger car. This increased stress is therefore normally commensurate with the essential inability of the crumple zones to absorb any more energy. In normal applications the securing bolts 10 may be suitably dimensioned and designed so that they give way at a load in the order of 30 metric tons.

When the force acting on the impact element 7 exceeds a certain limit, the securing bolts 10 will therefore break. As will now be described with reference to FIGS. 2 and 3, this in turn means that the impact element 7 together with the two link elements 8 is allowed to pivot backwards (that is to say in the opposite direction to the direction of travel of the truck in the collision). This pivoting movement then occurs about the direction of rotation defined by the shaft journal 9. As will be clearly seen from FIG. 7, in particular, each tube 11 is preferably formed with a recess or a groove 11a running around the periphery of the tube 11. This groove 11a acts as a marker which defines a local weakening in the tube and which controls the sequence in which the tube 11 is compressed primarily by stressing in its longitudinal direction. This marker affords greater facilities for effectively controlling the deformation of each tube 11 in a desired manner under a stress of the type described.

Figure 8:
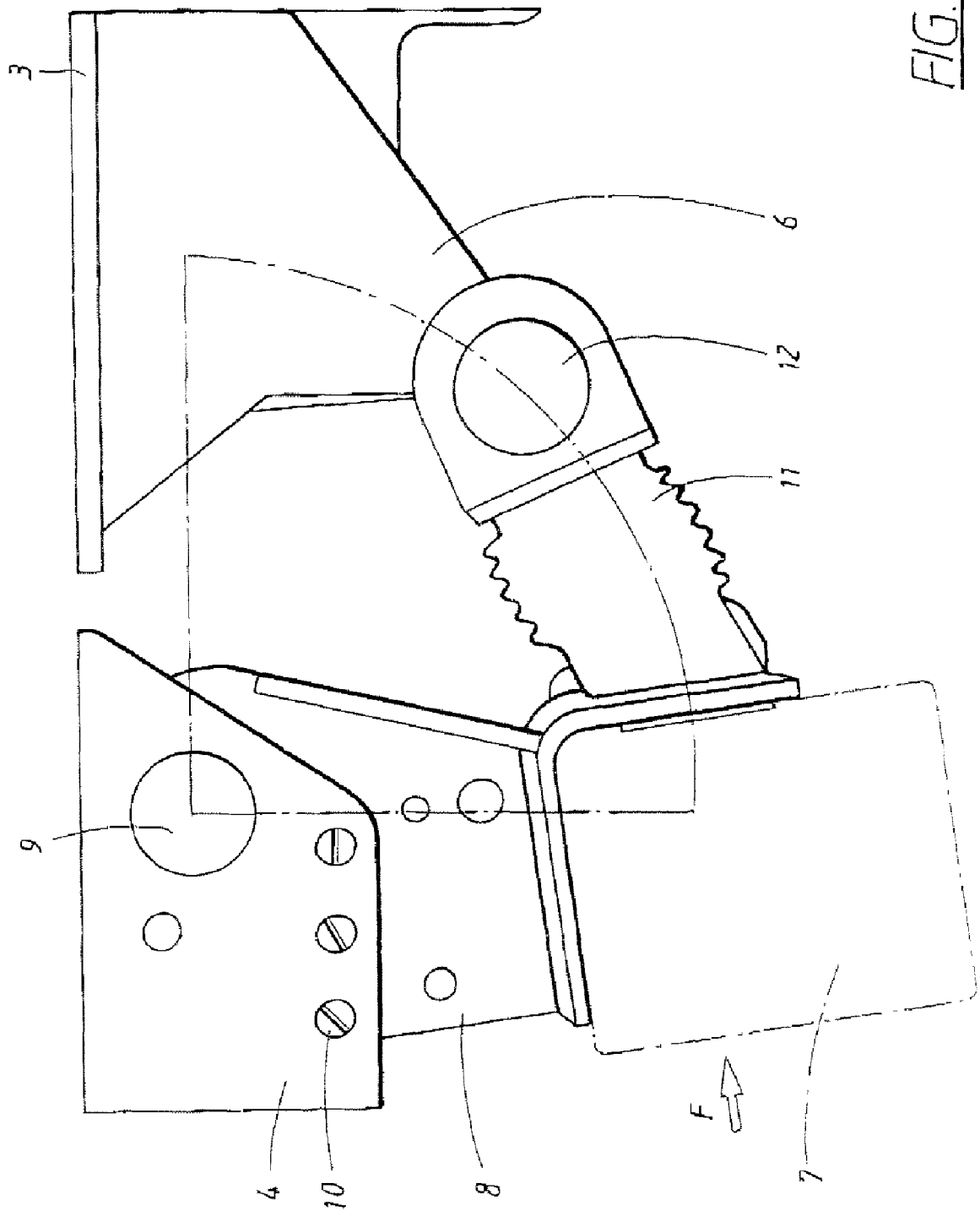
FIG. 8 is a detailed view of the arrangement according to the invention in a second working position.

FIG. 8 largely corresponds to what is shown in FIG. 7, but shows a second working position in which the impact element 7 and each link element 8 have been pivoted backwards somewhat. According to the invention, energy absorption occurs during the backward pivoting movement in that each tube 11 is designed and fixed in such a way that it allows energy to be absorbed as the tube 11 is compressed longitudinally. For this purpose the tube 11 is formed with a cross-section and from a material designed to permit compression under the stress that occurs in the relevant collision situation. As stated above, this stress is normally commensurate with the passenger car crumple zones having absorbed energy and a certain increase in the force then having occurred. As a result of each tube 11 being compressed, a further proportion of the energy generated during the collision will be absorbed.

The invention affords an advantage in that each tube 11 is securely fixed (for example, by welding) to the respective link element 8, while it is rotatably fixed to the respective rear bracket 6; that is to say, each tube 11 is rotatably fixed to the shaft journal 12 as can be seen from the figures. This fixing provides a well-adjusted deformation of the tube 11 as it is pivoted along a predefined path. This in turn allows a predetermined and effective deformation with high energy absorption during that part of a collision sequence when the impact element 7 is pivoted backwards.

Figure 9:
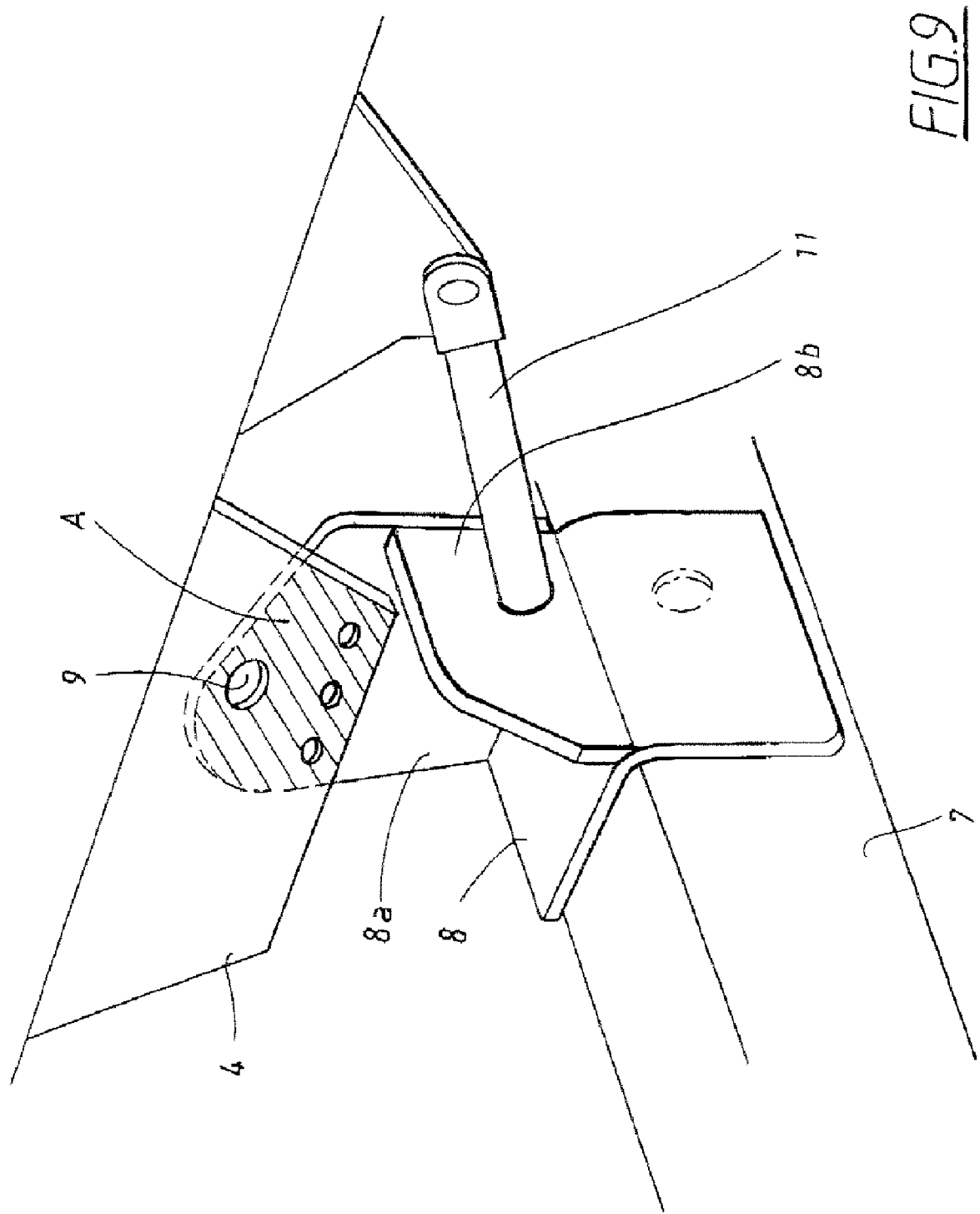
FIG. 9 is an oblique perspective view from behind showing the arrangement according to the invention.

FIG. 9 shows an oblique perspective rear view of an arrangement according to the invention. The figure shows a section of the aforementioned impact element 7 and its fixing to the truck in question, more specifically in its front right-hand part. The parts of the invention shown in FIG. 9 are denoted by the same reference numbers as in FIGS. 1, 7, and 8.

It can be seen particularly clearly from FIG. 9 how each link element 8 is fixed to a corresponding front bracket 4. According to the embodiment, the surface area with which each link element 8 and corresponding bracket 4 overlap one another is relatively large. In FIG. 9, this surface is marked by dashed lines and denoted by the reference designation A. An important advantage afforded by this arrangement is that its lateral stability, that is to say its capacity to withstand stresses acting (wholly or partially) transversely to the direction of travel of the vehicle, is dependent on the size of this overlapping area. For this reason the link element 8 and the front bracket 4 are formed in such a way that the area A is as large as possible, that is to say large enough to meet the requirements laid down with regard to lateral stability.

In order to further improve the lateral stability, the link element 8 is preferably designed as shown in FIG. 9; that is to say, as an essentially L-shaped component having two side elements, one side 8a being fixed to the corresponding front bracket 4 extending largely transversely to the longitudinal direction of the impact element 7, and the other side 8b also being fixed to the front bracket 4 but extending largely at right-angles from the first element 8a. In manufacturing the link element 8, the two elements 8a, 8b are suitably made as two plate-like components which are placed as shown in FIG. 9 and welded to one another and to the rest of the link element 8. All in all, this affords an advantage in the form of a further improvement in lateral stability.

It may thus be noted that the invention is based on the impact element 7 functioning as an unresilient barrier under relatively low stresses and furthermore being allowed to pivot about the shaft journal 9 when absorbing energy under stresses in excess of a certain predetermined limit. The energy absorption is achieved by a controlled compression of the compression tube 11. The limit is defined by the dimensions and the location of the bolted connection that is formed by the retaining bolts 10. Altogether this affords optimum control of energy absorption during a collision and a high degree of safety, especially for the occupants of the passenger car during a collision with the truck.

The invention also relates to a method of assembling an underrun protection for vehicles. The vehicle comprises a frame, an impact element arranged in a position corresponding to an anticipated stress from a force (F) in the event of a possible collision with another vehicle, and at least one connecting element by way of which the impact element is fixed to the frame. The impact element comprises an upper transverse beam, a lower transverse beam and at least one bolt constituting a connecting member between the upper and lower transverse beams. The method comprises the following steps: (1) a head or head and washer arranged on the bolt is inserted through a through-opening in the upper transverse beam, the through-opening being designed to allow the passage of the head or head and washer of the bolt; (2) the head or washer is then placed on bearing surfaces of the upper transverse beam; (3) the shank of the bolt is furthermore inserted into a through-opening or recess arranged in the lower transverse beam; and (4) a nut is fitted on the shank of the bolt for clamping the lower transverse beam to the upper transverse beam.

According to a preferred embodiment of the invention, the head of the bolt, and where appropriate, the bolt head and a washer fitted around the shank of the bolt are inserted into the through-opening by placing the bolt in a position in which the shank of the bolt forms an angle γ with a normal to the section of the beam in which the through-opening 17 is formed, following which the head of the bolt, and where appropriate the bolt head and washer, in this position is inserted through the through-opening.

According to a further preferred embodiment the head of the bolt is inserted with its shank aligned in a direction which forms an angle of less than 60° with a normal to a front boundary surface constituting the impact surface of the upper transverse beam.

The invention is not limited to the examples of embodiments described above but can be modified within the scope of the following patent claims. For example, the invention can in principle be used in all types of vehicle, such as trucks, loaders and buses, where a relatively high ground clearance is desired.

The invention is therefore not limited to use in conventional trucks. The invention can obviously also be used on underrun protection that is not pivotally fixed to the vehicle frame structure but is instead securely fixed.

With regard to the choice of material, the brackets 4 are preferably made of steel, while the impact element 7 is preferably made of steel, aluminum or other suitable material.

The invention can also in principle be used as an underrun protection that is arranged in the rear end section of a vehicle or along the sides thereof. Finally there may be two or more brackets 4 and link elements 8.

The limit at which the pivoting movement of the impact element 7 described above is permitted (by the locking elements 10 giving way and breaking) may be defined so that it corresponds to a situation where the crumple zones in the passenger car have been deformed more or less completely. The invention is not confined to this choice of limit value, however, but can be implemented by generally setting the limit to a value commensurate with the passenger car having absorbed a certain quantity of energy. The limit can also be defined on the basis of a stress, for example, with a force that is selected according to the prevailing statutory requirements.

Each tube 11 may have a different cross-section, for example circular, square or some other shape which is suitable for the desired compression of the respective tube 11. For an especially advantageous and controlled compression of each tube 11, it may also be provided with the marker 11a as shown in FIG. 7. The marker 11a may then be located in various ways and be given various dimensions (for example width and depth) depending on the application in question, and also depending on the prescribed requirements and the requirements with regard to compression of the tube 11.

What is claimed is:

1. An underrun protection arrangement for a vehicle comprising: a frame, an impact element arranged in a position corresponding to an anticipated stress from a force experienced in the event of a possible collision with another vehicle; the impact element comprising an upper transverse beam, wherein the impact element includes a lower transverse beam which is fixed to the upper transverse beam by a bolt forming a connection member between the upper and lower transverse beams, the bolt having a shank and a securement portion at an end thereof, the securement portion comprising a) the head of the bolt or b) the head of the bolt and a washer;

the upper transverse beam has at least one first through-opening with a periphery the shape of which firstly defines areas for the passage of the securement portion of the bolt through the first through-opening when the bolt is placed in a position in which the shank of the bolt forms an angle with a normal to the section of the beam in which the first through-opening is formed, and secondly a bearing surface in which the periphery of the first through-opening is arranged at a distance from a center point of the first through-opening which is less than the radial extent of the securement portion;

the shank of the bolt extends through the first through-opening in the upper transverse beam and a second through-opening arranged in the lower transverse beam;

the securement portion bears against the bearing surface of the upper transverse beam; and a nut is fitted on the shank of the bolt adjacent to the second through-opening arranged in the lower transverse beam for clamping the lower transverse beam to the upper transverse beam.

2. The arrangement as recited in claim 1, wherein the areas for the passage permit the passage of the securement portion by swiveling the bolt about an axis which is essentially parallel to the longitudinal direction of the upper transverse beam, the securement portion of the bolt being inserted with the shank of the bolt aligned in a direction which forms an angle of less than 60° with a normal to a front boundary surface constituting the impact surface of the upper transverse beam.

3. The arrangement as recited in claim 1, wherein the first through-opening in the upper transverse beam has the shape of a circle with two symmetrically arranged recesses, where the distance between outer parts of the periphery of the recesses is greater than the diameter of the circle.

4. The arrangement as recited in claim 1, wherein the lower transverse beam has an upper surface configured to bear against a lower surface of the upper transverse beam and wherein the lower transverse beam has at least one projection configured to be inserted into the first through-opening arranged in the upper beam, the projection having a cross-section of a shape such that the projection prevents relative displacement between the lower and the upper transverse beams in the plane of the upper surface when the projection is inserted in the first through-opening.

5. The arrangement as recited in claim 4, wherein the projection has a circular cross-section.

6. The arrangement as recited in claim 5 wherein the vertical extent of the projection is less than the depth of the corresponding first through-opening.

7. The arrangement as recited in claim 1, further comprising a connecting element comprising a link element which is firmly connected to the impact element and fixed to pivot in relation to the frame, and an energy-absorbing element which connects the impact element to the frame and which is designed to be compressed in the event of a pivoting movement of the impact element.

8. The arrangement as recited in claim 1, wherein the arrangement further comprises at least one connecting element that fixes the impact element to the frame.

9. A method of assembling an underrun protection for a vehicle that comprises a frame, an impact element arranged in a position corresponding to an anticipated stress from a force in the event of a possible collision with another vehicle, the impact element comprising an upper transverse beam, a lower transverse beam, and at least one bolt functioning as a connecting member between the upper and lower transverse beams, the bolt having a shank and a securement portion at an end thereof, the securement portion comprising a) the head of the bolt or b) the head of the bolt and a washer, the method comprising:

inserting the securement portion of the bolt through a first through-opening in the upper transverse beam, the first through-opening being configured to allow passage thereof;

placing the securement portion of the bolt adjacent to a bearing surface;

inserting the shank of the bolt into one of a second through-opening and a recess arranged in the lower transverse beam; and fitting a nut on the shank of the bolt for clamping the lower transverse beam to the upper transverse beam.

10. The method as recited in claim 9, wherein the securement portion of the bolt is inserted into the first through-opening by placing the bolt in a position in which the shank of the bolt forms an angle with a normal to the section of the beam in which the first through-opening is formed, following which the securement portion of the bolt in this position is inserted through the first through-opening.

11. The method as recited in claim 10, wherein the securement portion of the bolt is inserted with the shank of the bolt aligned in a direction which forms an angle of less than 60° with a normal to a front boundary surface constituting an impact surface of the upper transverse beam.

12. A vehicle comprising an underrun protection arrangement as recited in claim 1.

* * * * *